(12) United States Patent
Bengtsson et al.

(10) Patent No.: US 9,020,447 B2
(45) Date of Patent: Apr. 28, 2015

(54) ELECTRONIC DEVICES, METHODS, AND COMPUTER PROGRAM PRODUCTS FOR MAKING A CHANGE TO AN ANTENNA ELEMENT BASED ON A POWER LEVEL OF A TRANSMISSION POWER AMPLIFIER

(75) Inventors: Erik Lennart Bengtsson, Eslöv (SE); Olof Zander, Lund (SE); Scott LaDell Vance, Staffanstorp (SE); Pär Håkansson, Malmö (SE); Daniel Lönblad, Genarp (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 415 days.

(21) Appl. No.: 13/480,099

(22) Filed: May 24, 2012

(65) Prior Publication Data

US 2013/0316662 A1 Nov. 28, 2013

(51) Int. Cl.
*H04B 1/44* (2006.01)
*H04B 7/08* (2006.01)
*H04B 17/00* (2006.01)
*H04W 52/42* (2009.01)

(52) U.S. Cl.
CPC ............. *H04B 7/0874* (2013.01); *H04B 17/00* (2013.01); *H04W 52/42* (2013.01)

(58) Field of Classification Search
CPC ...... H04B 7/0874; H04B 1/0064; H04B 1/44; H04B 7/0802; H04B 7/0825; H04W 52/42

USPC .............. 455/522, 13.4, 77, 78, 83, 87, 73, 455/562.1, 193.1, 269, 272, 277.1
See application file for complete search history.

(56) References Cited

U.S. PATENT DOCUMENTS 6,600,933 B1 * 7/2003 Hiramatsu et al. ............ 455/561
2008/0139128 A1 6/2008 Liao

FOREIGN PATENT DOCUMENTS

JP 2004-363863 12/2004
WO WO 02/29990 A1 4/2002

OTHER PUBLICATIONS

European Search Report Corresponding to European Application No. 13163270.5-1852; Dated: Apr. 14, 2014; 6 Pages.
Extended European Search Report Corresponding to European Application No. 13163270.5; Dated: Sep. 5, 2014; 9 Pages.

* cited by examiner

*Primary Examiner* — Tuan Pham
(74) *Attorney, Agent, or Firm* — Myers Bigel Sibley & Sajovec, PA (57) ABSTRACT

A method of operating an electronic device includes providing a plurality of antenna elements, determining that a change is to be made to at least one of the plurality of antenna elements, and scheduling the change to the at least one of the plurality of antenna elements during a time interval that a transmission power amplifier has a power level below a threshold. The change to the at least one of the plurality of antenna elements may also be made responsive to a reduction to the power level of the transmission power amplifier below the threshold.

21 Claims, 7 Drawing Sheets

FIG. 6 ic DEVICES, METHODS, AND
COMPUTER PROGRAM PRODUCTS FOR
MAKING A CHANGE TO AN ANTENNA
ELEMENT BASED ON A POWER LEVEL OF
A TRANSMISSION POWER AMPLIFIER

BACKGROUND OF THE INVENTION

Wireless communication devices, such as WIFI 802.11N and LTE compliant communication devices, are increasingly using Multiple Input-Multiple Output (MIMO) antenna technology to provide increased data communication rates with decreased error rates. A MIMO antenna includes at least two antenna elements.

MIMO technology may offer significant increases in data throughput and/or transmission range without the need for additional bandwidth or transmit power. It can achieve this due to the ability of MIMO to obtain higher spectral efficiency (more bits per second per hertz of bandwidth) and/or reduced fading.

MIMO based systems allow the use of a variety of coding techniques that take advantage of the presence of multiple transmit and receive antennas. For example, wireless communications performed over a MIMO channel can use beamforming, spatial multiplexing and/or diversity coding techniques.

The operational performance of a MIMO antenna depends upon obtaining sufficient decoupling and decorrelation between its antenna elements. It is therefore usually desirable to position the antenna elements far apart within a device and/or to use radiofrequency (RF) shielding therebetween while balancing its size and other design constraints.

Correlation between antennas can also be reduced by causing the antennas to have different polarizations, i.e. sending and receiving signals with orthogonal polarizations. Furthermore, antennas for MIMO systems may utilize spatial separation, or physical separation, to reduce correlation between antennas.

Mobile terminals may need to cover multiple-bands in Long Term Evolution (LTE) environments. Antenna systems may, therefore, be required to cover up to seven different frequency bands, for example. In addition, the antenna systems may be required to meet the requirements of Single Input-Single Output (SISO) and Single Input-Multiple Output (SIMO) for 3GPP and 2G bands. The antenna configuration will generally be required to fulfill Specific Absorption Rate (SAR) requirements and other industry standards as well. User effects, such as the way a user holds a mobile terminal relative to the positioning of the antenna elements therein may affect the over the air performance of the device.

SUMMARY

According to some embodiments of the present invention, an electronic device is operated by providing a plurality of antenna elements, determining that a change is to be made to at least one of the plurality of antenna elements, and scheduling the change to the at least one of the plurality of antenna elements during a time interval that a transmission power amplifier has a power level below a threshold.

In other embodiments, the change comprises determining that at least one of a first one of the plurality of antenna elements assigned to a main wireless signal reception and transmission path and a second one of the plurality of antenna elements assigned to a diversity wireless signal reception path is to be changed to a different one of the plurality of antenna elements.

In still other embodiments, the change comprises determining that the at least one of the plurality of antenna elements is to be tuned.

In still other embodiments, the method further comprises evaluating a wireless communication performance criterion to obtain a performance evaluation. Determining that the change is to be made to the at least one of the plurality of antenna elements comprises determining the change is to be made to the at least one of the plurality of antenna elements based on the performance evaluation.

In still other embodiments, evaluating the wireless communication performance criterion comprises determining transmission power for signals transmitted through each of the plurality of antenna elements and power associated with signals reflected back through each of the plurality of antenna elements.

In still other embodiments, evaluating the wireless communication performance criterion comprises determining Received Signal Strength Indication (RSSI) data for each of the plurality of antenna elements.

In still other embodiments, evaluating the wireless communication performance criterion comprises processing feedback from a wireless base station, the feedback including signal strength information for signals transmitted from each of the plurality of antenna elements.

In still other embodiments, evaluating the wireless communication performance criterion comprises determining proximity information of structure abutting the mobile terminal via at least one sensor.

In still other embodiments, the electronic device is a mobile terminal.

In still other embodiments, a computer program product comprises a non-transitory computer readable program medium. The computer readable program medium comprises computer readable program code configured to carry any of the above-described methods.

In still other embodiments, an electronic device is configured to carry out any of the above-described methods.

In further embodiments, an electronic device is operated by providing a plurality of antenna elements, determining that a change is to be made to at least one of the plurality of antenna elements, reducing a power level of a wireless signal transmission power amplifier below a threshold level, and performing the change to the at least one of the plurality of antenna elements responsive to the power level being reduced below the threshold level.

In still further embodiments, wherein the change comprises determining that at least one of a first one of the plurality of antenna elements assigned to a main wireless signal reception and transmission path and a second one of the plurality of antenna elements assigned to a diversity wireless signal reception path is to be changed to a different one of the plurality of antenna elements.

In still further embodiments, the change comprises determining that the at least one of the plurality of antenna elements is to be tuned.

In still further embodiments, the method further comprises evaluating a wireless communication performance criterion to obtain a performance evaluation. Determining that the change is to be made to the at least one of the plurality of antenna elements comprises determining the change is to be made to the at least one of the plurality of antenna elements based on the performance evaluation.

In still further embodiments, evaluating the wireless communication performance criterion comprises determining transmission power for signals transmitted through each of the plurality of antenna elements and power associated with signals reflected back through each of the plurality of antenna elements.

In still further embodiments, evaluating the wireless communication performance criterion comprises determining Received Signal Strength Indication (RSSI) data for each of the plurality of antenna elements.

In still further embodiments, evaluating the wireless communication performance criterion comprises processing feedback from a wireless base station, the feedback including signal strength information for signals transmitted from each of the plurality of antenna elements.

In still further embodiments, evaluating the wireless communication performance criterion comprises determining proximity information of structure abutting the mobile terminal via at least one sensor.

In still further embodiments, the method further comprises increasing the power level of the wireless signal transmission power amplifier above the threshold level responsive to a completion of the change to the at least one of the plurality of antenna element.

In still further embodiments, the electronic device is a mobile terminal.

In still further embodiments, a computer program product comprises a non-transitory computer readable program medium. The computer readable program medium comprises computer readable program code configured to carry out any of the above-described methods.

In still further embodiments, an electronic device is configured to carry out any of the above-described methods.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "signal" may take the form of a continuous waveform and/or discrete value(s), such as digital value(s) in a memory or register. As used herein, the terms "module," "circuit," and "controller" may take the form of digital circuitry, such as computer-readable program code executed by an instruction processing device(s) (e.g., general purpose microprocessor and/or digital signal processor), and/or analog circuitry.

It will be understood that embodiments of the invention may be implemented in an electronic device, such as a mobile terminal, that includes a Multiple-Input Multiple-Output (MIMO) antenna that is configured to transmit and receive RF signals in two or more frequency bands. The MIMO antenna may be configured, for example, to transmit/receive RF communication signals in the frequency ranges used for cellular communications (e.g., cellular voice and/or data communications), WLAN communications, and/or TransferJet communications, etc. As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

It will be understood mobile terminals according to various embodiments of the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

Some embodiments of the present invention stem from a realization that Long Term Evolution (LTE) mobile devices may need antenna systems that cover seven frequency bands (760-800 MHz, 824-894 MHz, 880-960 MHz, 1710-1850 MHz, 1820-1990 MHz, 1920-2170 MHz, and 2500-2700 MHz. The antenna systems used in LTE devices may also need to meet the requirements of Single In-Single Output (SISO) and Single In-Multiple Output (SIMO) applications for other 3GPP and 2G bands. The antenna systems may be required to meet Specific Absorption Rate (SAR) requirements and other industry standards. To enhance the performance of such a device, an intelligent control system, according to some embodiments of the present invention, may be used to select particular antenna(s) for transmitting and receiving wireless signals based on various performance factors and criteria and/or may tune the individual antennas for improved reception and/or transmission. Switching and/or tuning circuits, however, may be damaged and/or linearity problems may be generated when the switching and/or tuning circuits are operated while the transmission power amplifier is operating at standard or normal operational power. In addition, the transmission power amplifier itself may be damaged when switching between antenna elements or tuning antenna elements. According to some embodiments of the present invention, the power level of the transmission power amplifier is reduced when making a change (e.g., reassignment to a different signal processing path, such as a main or diversity path and/or tuning) to one or both of the antenna elements. The changes to the antenna elements can be scheduled for a time interval when the power level of the transmission power amplifier is already below a desired threshold or a power level of the transmission power amplifier can be momentarily reduced while the change is made.

Figure 1A:
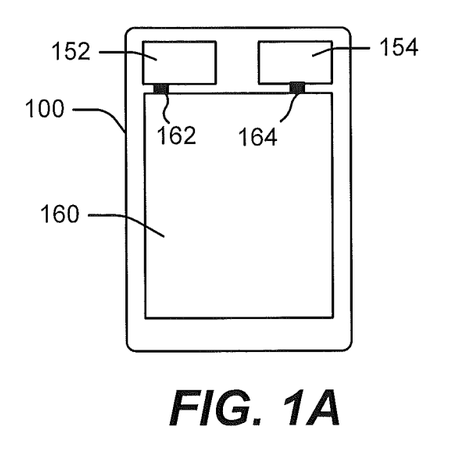
FIGS. 1A and 1B are diagrams of a mobile terminal that includes a Multiple Input-Multiple Output (MIMO) antenna array in accordance with some embodiments of the present invention.
Figure 1B:
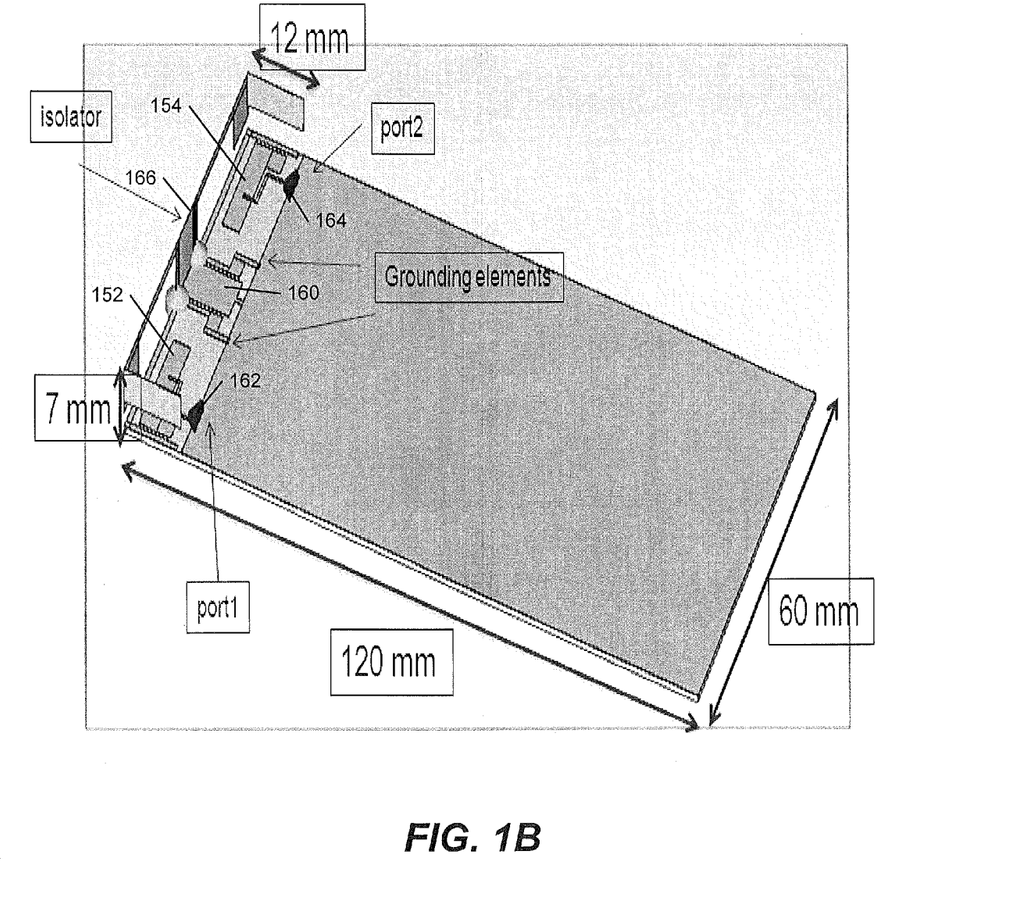

FIGS. 1A and 1B illustrate a mobile terminal 100 including a MIMO antenna that includes at least two radiating elements or antennas 152, 154. The first and second radiating elements 152, 154 may be formed on a planar substrate, such as on a conventional printed circuit board, which includes a dielectric material, ceramic material, or insulation material. The first and second radiating elements 152, 154 are adjacent to grounding elements 160, which couple the first and second radiating elements 152, 154 to a ground plane on the printed circuit board. The first and second radiating elements 152, 154 may be formed by patterning a conductive (e.g., metallization) layer on a printed circuit board. The ground plane 160 may act as a counterpoise for each of the first and second radiating elements 152, 154.

RF signals are coupled to the first radiating element 152 through a first feed element or port 162, while RF signals are coupled to the second radiating element 154 through a second feed element or port 164. The first feed element 162 is coupled to the first radiating element 152 near an end of the first radiating element 152, so that the first radiating element 152 generally extends away from the first feed element 162 along an upper end of the mobile terminal 100.

Similarly, the second feed element 164 is coupled to the second radiating element 154 near an end of the second radiating element 154, so that the second radiating element 152 generally extends away from the second feed element 164 along the upper end of the mobile terminal 100. The two radiating elements 152 and 154 are separated via an isolator element 166.

Although shown with both radiating elements or antennas 152, 154 at the same end of the mobile terminal 100, it will be understood that the radiating elements or antennas 152 and 154 may be disposed in a variety of positions in mobile terminal 100 in accordance with various embodiments of the present invention. Moreover, more than two antennas can be used in other embodiments of the present invention.

In general, the efficiency of a single antenna is increased when the antenna excites the fundamental mode of the antenna's counterpoise. However, if both antennas in a MIMO antenna excite the same mode, they will tend to experience mutual coupling. This coupling causes the signals on the antennas to become correlated, which can reduce the performance of the MIMO antenna system.

An additional complexity arises when the MIMO antennas are used in a dual band system, i.e., a system that is intended to operate over more than one frequency range. For example, in a Long Term Evolution (LTE) handset, the antenna may transmit/receive signals in both a 750 MHz band and an 850 MHz band. Within this general frequency range, the correlation of radiating elements that use the same ground plane may be unacceptably high, such as about 0.8 to 0.9.

Figure 2:
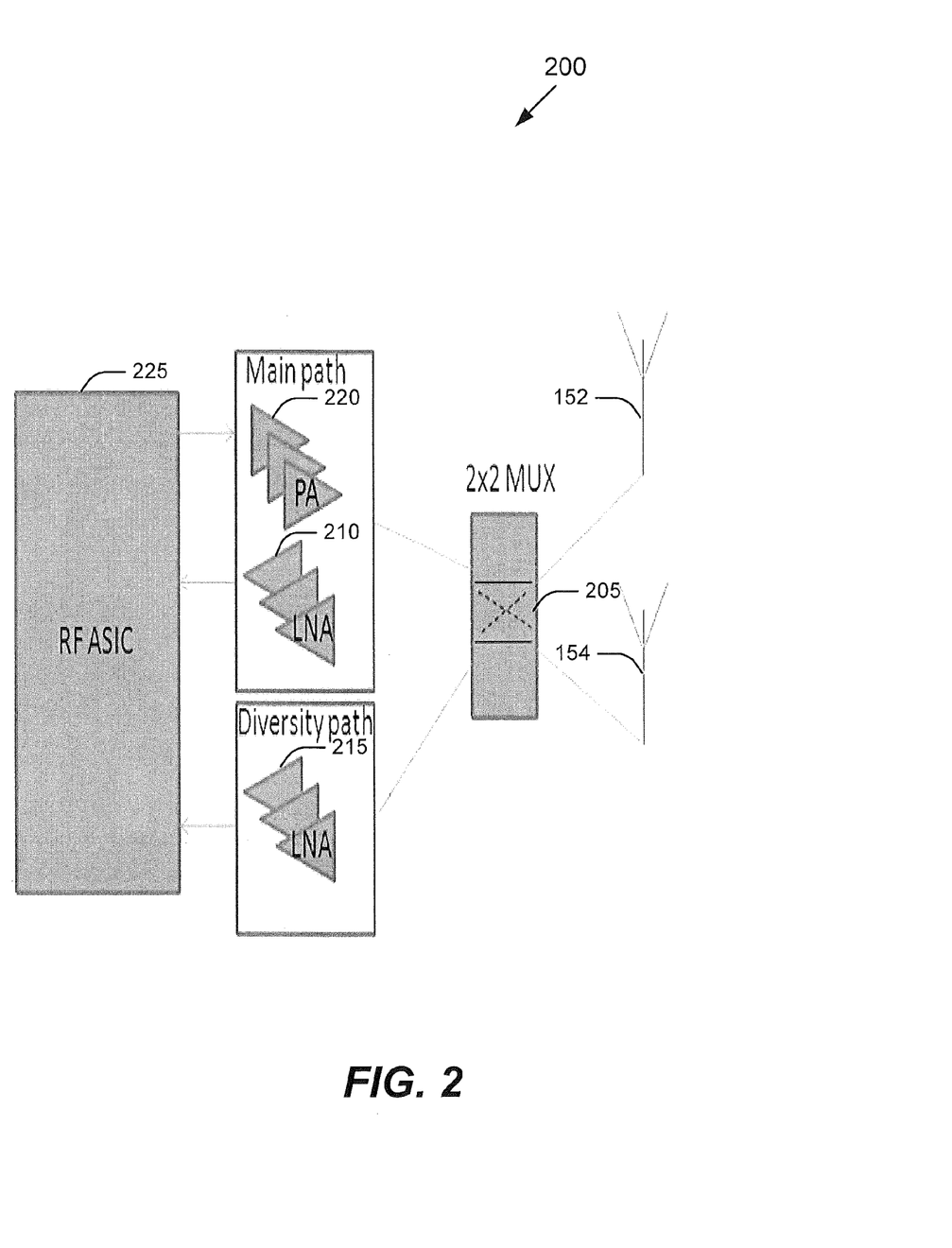
FIGS. 2 and 3 are block diagrams that illustrate control circuitry for selecting an antenna in a mobile terminal that includes a MIMO antenna system based on a power level of a transmission power amplifier in accordance with various embodiments of the present invention.

FIG. 2 is a block diagram that illustrates control circuitry for selecting an antenna in a mobile terminal that includes a MIMO antenna system 200 according to some embodiments of the present invention. The MIMO antenna system 200 comprises antennas 152 and 154 that are connected to downconvertor circuitry via a multiplexer 205. The downconvertor circuitry comprises low noise amplifiers (LNAs) 210 and 215 in the main path and diversity path, respectively, along with power amplifiers (PAs) 220 in the main path. An RF ASIC 225 is coupled to the amplifier circuits 210, 215, and 220 and may be configured to implement the mixer circuits, oscillators, and input/output filters to generate the complex baseband signal from a received RF signal via antennas 152 and 154 and to generate the RF signal for transmission on one of the antennas 152 and 154 from a complex baseband signal. To enhance the performance of a mobile terminal incorporating the MIMO antenna system 200, the multiplexer 205 is operable in response to various control circuitry and signals to select one the antennas 152 and 154 for transmission and to select which of the antennas 152 and 154 is to be used for the main path signal and which is to be used for the diversity path signal when processing a received RF signal.

Figure 3:
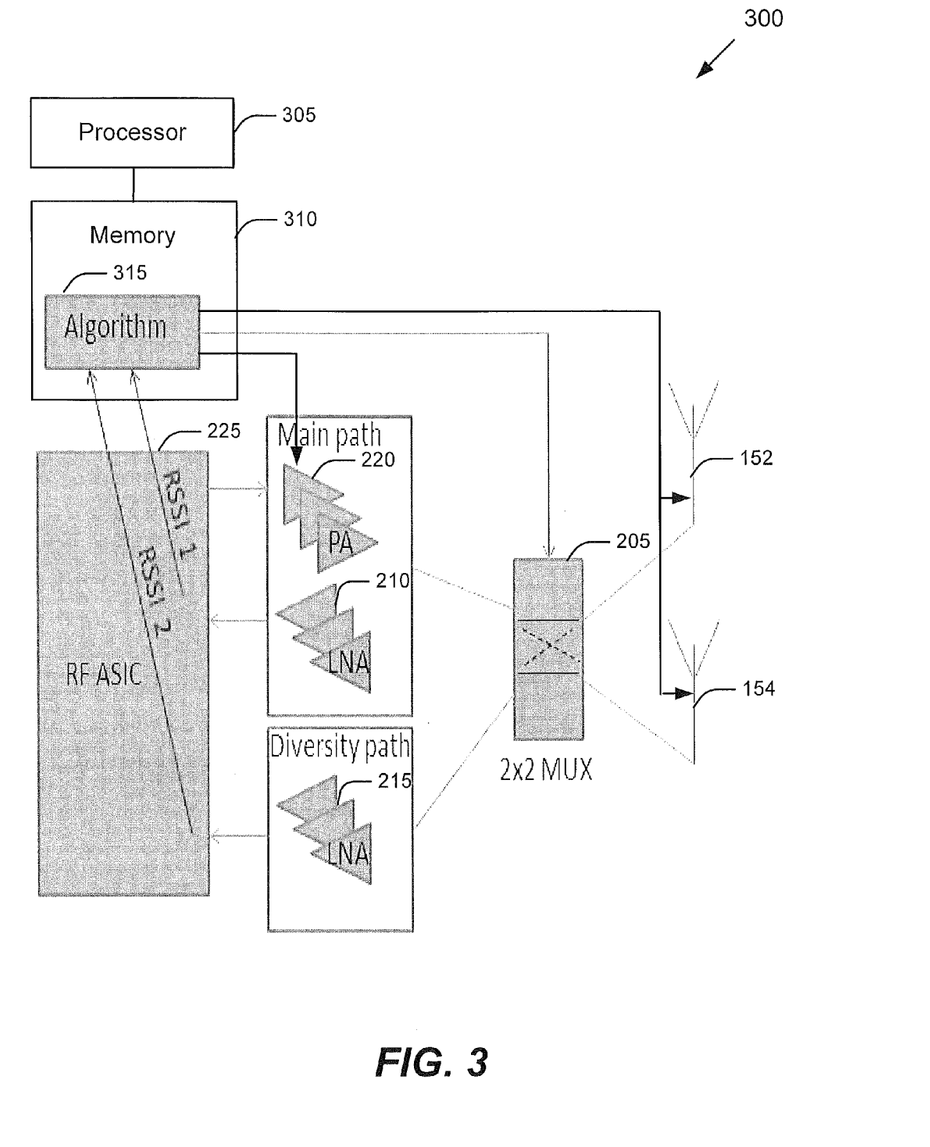

FIG. 3 is a block diagram that illustrates control circuitry for selecting an antenna in a mobile terminal that includes a MIMO antenna system 300 and for adjusting a power level in the transmission power amplifier according to some embodiments of the present invention. The MIMO antenna system 300 is similar to that illustrated in FIG. 2, but includes a processor 305 coupled to a memory 310 that includes a Received Signal Strength Indication (RSSI) antenna selection module 315. According to some embodiments, the RF ASIC 225 provides RSSI data, which is processed using the antenna selection module 315. The RSSI data may be collected for both antennas 152 and 154 (i.e., both the main and diversity paths) and the RSSI antenna selection module 315 may determine which antenna provides signals with the higher RSSI power values. The multiplexer 205 may then be used to assign the antenna with the best RSSI power value to the main path in response to a signal from the processor 305 and/or may adjust the tuning of the antenna elements 152 and/or 154. When a switch is to made with respect to which antenna element 152, 154 is assigned to the main and diversity paths and/or an adjustment is made to the tuning of either antenna element 152, 154, the antenna selection module 315 may be further configured to generate a signal to adjust the transmission power level of the transmission power amplifier 220. Once the transmission power level of the transmission power amplifier 220 is reduced below a threshold level, the assignment of the antenna elements 152, 154 to the main and diversity paths and/or adjustment to the tuning of the antenna elements 152, 154 can be made. Once these changes have completed, the power level of the transmission power amplifier 220 can be restored.

Figure 4:
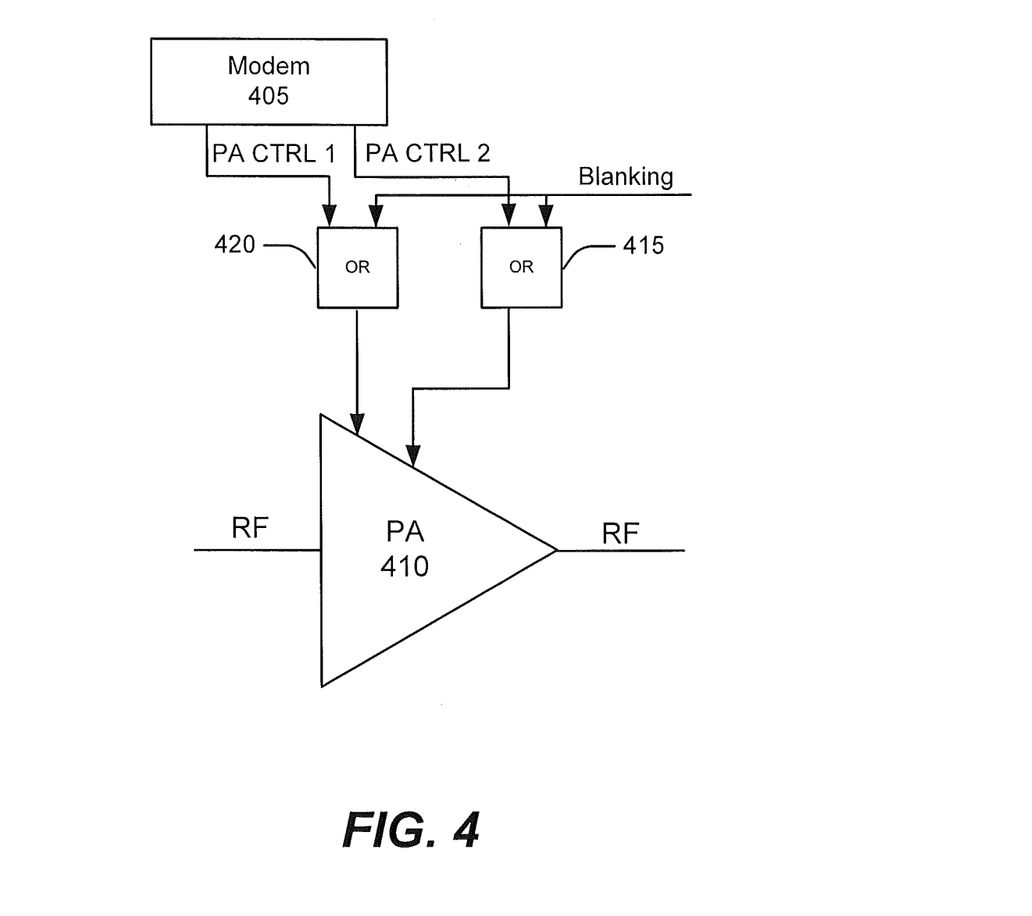
FIG. 4 is a block diagram that illustrates control circuitry for adjusting a power level of a transmission power amplifier in accordance with some embodiments of the present invention.

FIG. 4 is a block diagram that illustrates control circuitry for adjusting the power level of a transmission power amplifier according to some embodiments of the present invention. The power amplifier control circuitry includes a modem module 405 that generates one or more power level control signals. In the example of FIG. 4, the modem module 405, the modem module generates two power level control signals PA CTRL1 and PA CTRL2. These power level control signals are gated to the transmission power amplifier 410 via "OR" logic circuits 420 and 415, respectively. The power level could be adjusted, for example, based on the values of PA CTRL1 and PA CTRL2. In some embodiments, when PA CTRL1 and PA CTRL2 are 00 no power reduction is applied, with successively greater power reductions applied for values of 01, 10, and 11. A blanking signal generated, for example, by the antenna selection module 315 of FIG. 3 can be used to apply a maximum power reduction to the transmission power amplifier 410. The antenna selection module 315 can use the blanking signal to reduce the power level of the transmission power amplifier 410 below a threshold when a change is to be made to one or both of the antenna elements 152, 154, i.e., when a change is made regarding which antenna element is assigned to the main and diversity signal paths and/or when either of the antenna elements is tuned.

Returning to the embodiments of FIG. 3, the selection of which antenna to assign to the main path and which to assign to the diversity path is based solely on the performance in the frequency bands involved in signal reception. This may not be a disadvantage, however, in systems where the correlation between the receive and transmit frequency performance is high.

While FIG. 3 illustrates embodiments in which RSSI is used as a wireless performance criterion that is evaluated and used as a basis for determining whether a change is to be made to one or both of the antenna elements 152, 154, i.e., whether to change which antenna element is assigned to the main and diversity signal paths and/or whether to tune either of the antenna elements, other wireless communication criteria can also be used in combination or individually in accordance with various embodiments of the present invention. For example, in some embodiments, the wireless communication performance criterion comprises determining transmission power for signals transmitted through each of the antenna elements 152, 154 and power associated with signals reflected back through each of the plurality of antenna elements. The transmitted power can be compared with the reflected power and used as a basis for assigning a particular antenna element to the main signal path or the diversity signal path and/or as a basis for tuning one or more of the antenna elements. In other embodiments, the wireless communication performance criterion comprises processing feedback from a wireless base station. The feedback may include signal strength information for signals transmitted from each of the plurality of antenna elements. The feedback, such as the signal strength information, may be used as a basis for assigning a particular antenna element to the main signal path or the diversity signal path and/or as a basis for tuning one or more of the antenna elements. In still other embodiments, evaluating the wireless communication performance criterion comprises determining proximity information of structure abutting the mobile terminal via at least one sensor. For example, depending on the way a mobile terminal is being held certain antenna elements may be more or less affected by the particular placement of a user's hand. Such structure proximity information may be used as a basis for assigning a particular antenna element to the main signal path or the diversity signal path and/or as a basis for tuning one or more of the antenna elements.

Figure 5:
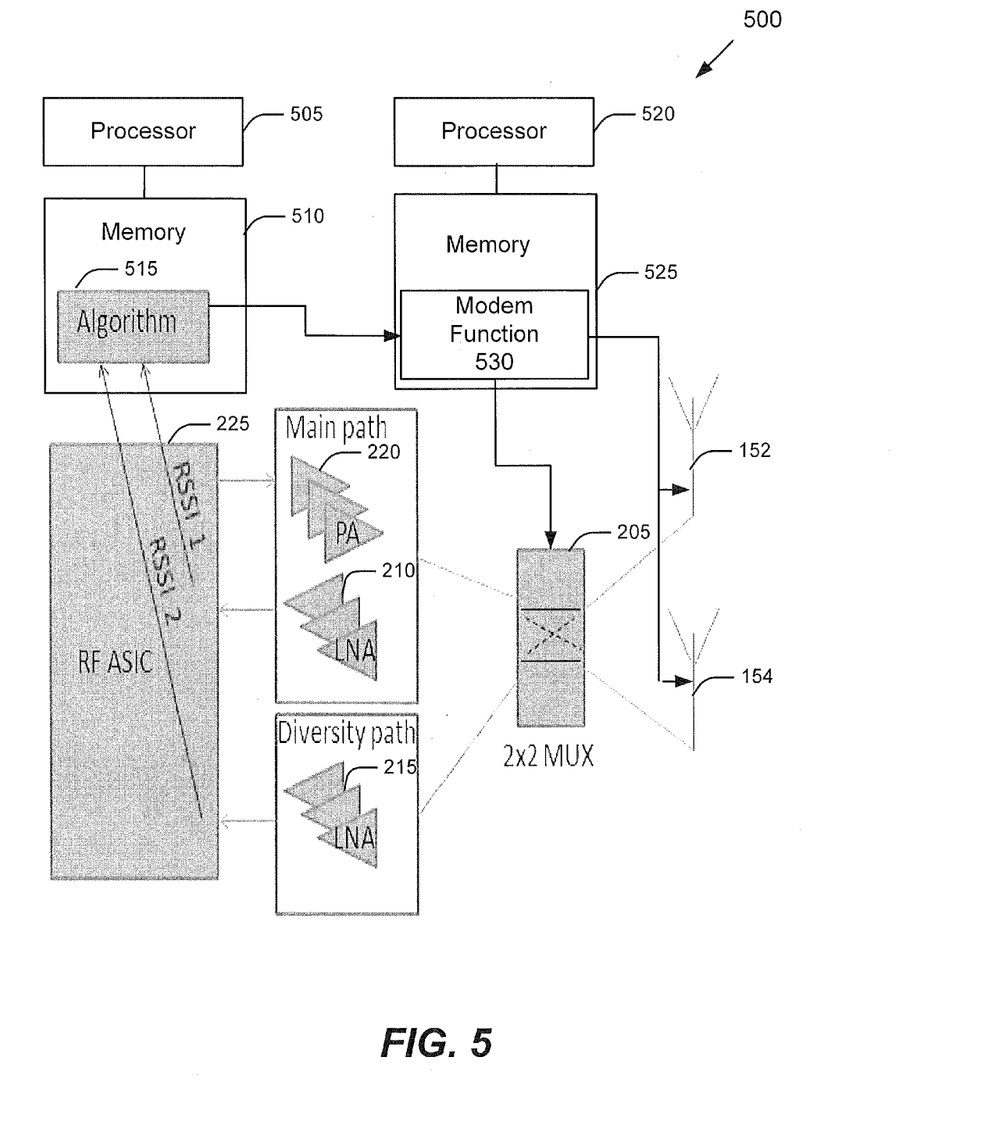
FIG. 5 is a block diagram that illustrates control circuitry for selecting an antenna in a mobile terminal that includes a MIMO antenna system based on a power level of a transmission power amplifier in accordance with various embodiments of the present invention.

FIG. 5 is a block diagram that illustrates control circuitry for selecting an antenna in a mobile terminal that includes a MIMO antenna system 500 and for adjusting a power level in the transmission power amplifier according to some embodiments of the present invention. The MIMO antenna system 500 is similar to that illustrated in FIGS. 2 and 3, but operates differently in that the power level of the transmission power amplifier 220 is not adjusted to when making a change to one or both of the antenna elements 152, 154, i.e., when a change is made regarding which antenna element is assigned to the main and diversity signal paths and/or when either of the antenna elements is tuned. According to some embodiments, the RF ASIC 225 provides RSSI data, which is processed using the antenna selection module 515. The RSSI data may be collected for both antennas 152 and 154 (i.e., both the main and diversity paths) and the RSSI antenna selection module 515 may determine which antenna provides signals with the higher RSSI power values. The multiplexer 205 may then be used to assign the antenna with the best RSSI power value to the main path in response to a signal from the processor 505 and/or may adjust the tuning of the antenna elements 152 and/or 154. Specifically, as shown in FIG. 5, the MIMO antenna system 500 includes a processor 520 that communicates with a memory 525 having a modem function module 530. Although shown separately, the processors 505 and 520 may be implemented as a single processor or separate processors. Likewise, the memories 510 and 525 may be implemented as a single memory or separate memories in accordance with various embodiments of the present invention. The antenna selection module 515 communicates with the modem function module 530, which communicates with the multiplexer 205 to assign the antenna elements 152, 154 to the main and diversity signals paths and/or adjust the tuning of the antenna elements 152, 154. To avoid making changes to an antenna element 152, 154, such as signal path assignment and/or tuning, while the transmission power amplifier 220 is at a higher power level, i.e., above a defined threshold, the modem function 530 schedules the change during a time interval when the transmission power level of the transmission power amplifier 220 is below a defined threshold.

While FIG. 5 illustrates embodiments in which RSSI is used as a wireless performance criterion that is evaluated and used as a basis for determining whether a change is to be made to one or both of the antenna elements 152, 154, i.e., whether to change which antenna element is assigned to the main and diversity signal paths and/or whether to tune either of the antenna elements, other wireless communication criteria can also be used in combination or individually in accordance with various embodiments of the present invention as described above with respect to FIG. 3.

Figure 6:
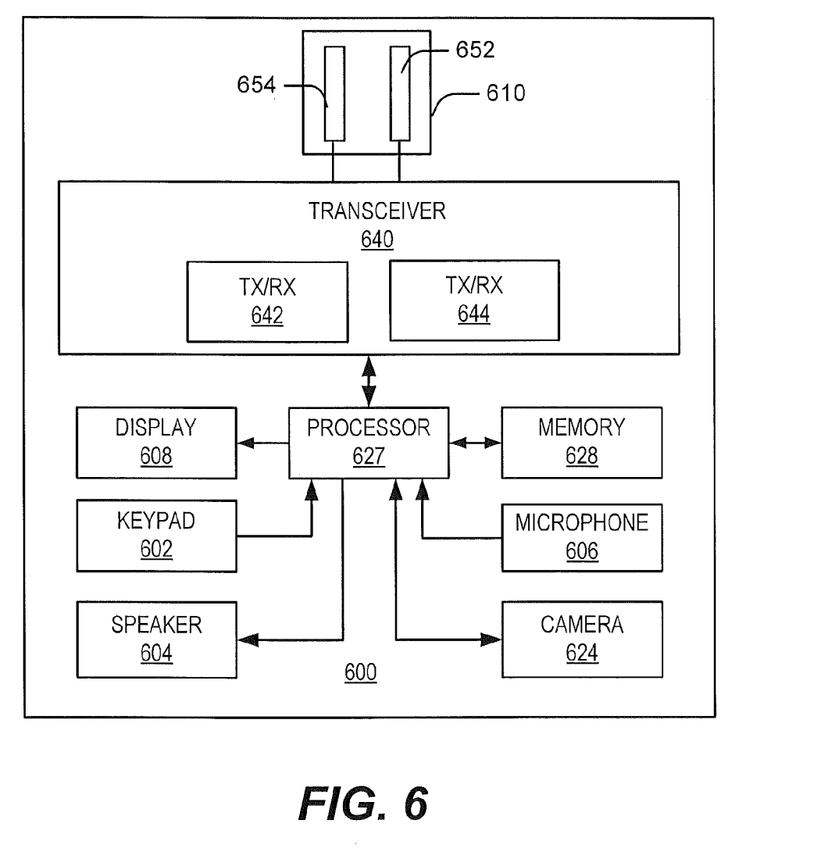
FIG. 6 is a block diagram of a mobile terminal in accordance with some embodiments of the present invention.

FIG. 6 is a block diagram of a wireless communication terminal 600 that includes a MIMO antenna array in accordance with some embodiments of the present invention. Referring to FIG. 6, the mobile terminal 600 includes a MIMO antenna array 610, a transceiver 640, a processor 627, and can further include a conventional display 608, keypad 602, speaker 604, mass memory 628, microphone 606, and/or camera 624, one or more of which may be electrically grounded to the same ground plane as the MIMO antenna array 610. The MIMO antenna array 610 may be structurally configured as shown in FIGS. 1A and 1B, or may be configured in accordance with various other embodiments of the present invention. Moreover, MIMO antennas in accordance with various embodiments of the present invention may be embodied as, but are not limited to, ground free monopole antennas, planar inverted F-antennas (PIFA) radiating elements and/or on-ground antenna radiating elements as well.

The transceiver 640 may include transmit/receive circuitry (TX/RX) that provides separate communication paths for supplying/receiving RF signals to different radiating elements of the MIMO antenna 610 via their respective RF feeds. Accordingly, when the MIMO antenna 610 includes two radiating antenna elements 652, 654, the transceiver 640 may include two transmit/receive circuits 642, 644 connected to different ones of the antenna elements via the respective RF feeds.

The transceiver 640 in cooperation with the processor 627 may be configured to communicate according using at least one radio access technology in two or more frequency ranges. The at least one radio access technology may include, but is not limited to, WLAN (e.g., 802.11), WiMAX (Worldwide Interoperability for Microwave Access), TransferJet, 3GPP LTE (3rd Generation Partnership Project Long Term Evolution), Universal Mobile Telecommunications System (UMTS), Global Standard for Mobile (GSM) communication, General Packet Radio Service (GPRS), enhanced data rates for GSM evolution (EDGE), DCS, PDC, PCS, code division multiple access (CDMA), wideband-CDMA, and/or CDMA2000. Other radio access technologies and/or frequency bands can also be used in embodiments according to the invention.

It will be appreciated that certain characteristics of the components of the MIMO antennas shown in the figures such as, for example, the relative widths, conductive lengths, and/or shapes of the radiating elements, the conductive neutralization lines, and/or other elements of the MIMO antennas may vary within the scope of the present invention.

Many variations and modifications can be made to the exemplary embodiments without substantially departing from the principles of the present invention. All such variations and modifications are intended to be included herein within the scope of the present invention, as set forth in the following claims.

That which is claimed:

1. A method of operating an electronic device, comprising:
providing a plurality of antenna elements;
determining that a change is to be made to at least one of the plurality of antenna elements; and
scheduling the change to the at least one of the plurality of antenna elements during a time interval that a transmission power amplifier has a power level below a threshold;
wherein determining that a change is to be made comprises determining that a first one of the plurality of antenna elements assigned to a main wireless signal reception path is to be changed to a diversity wireless signal reception path and a second one of the plurality of antenna elements assigned to the diversity wireless signal reception path is to be changed to the main wireless signal reception path.

2. The method of claim 1, wherein the change comprises determining that the at least one of the plurality of antenna elements is to be tuned.

3. The method of claim 1, further comprising:
evaluating a wireless communication performance criterion to obtain a performance evaluation;
wherein determining that the change is to be made to the at least one of the plurality of antenna elements comprises determining the change is to be made to the at least one of the plurality of antenna elements based on the performance evaluation.

4. The method of claim 3, wherein evaluating the wireless communication performance criterion comprises determining transmission power for signals transmitted through each of the plurality of antenna elements and power associated with signals reflected back through each of the plurality of antenna elements.

5. The method of claim 3, wherein evaluating the wireless communication performance criterion comprises determining Received Signal Strength Indication (RSSI) data for each of the plurality of antenna elements.

6. The method of claim 3, wherein evaluating the wireless communication performance criterion comprises processing feedback from a wireless basestation, the feedback including signal strength information for signals transmitted from each of the plurality of antenna elements.

7. The method of claim 3, wherein evaluating the wireless communication performance criterion comprises determining proximity information of structure abutting the mobile terminal via at least one sensor.

8. The method of claim 1, wherein the electronic device is a mobile terminal.

9. A computer program product comprising a non-transitory computer readable program medium, the computer readable program medium comprising computer readable program code configured to carry out the method of claim 1.

10. An electronic device configured to carry out the method of claim 1.

11. A method of operating an electronic device, comprising:

providing a plurality of antenna elements;

determining that a change is to be made to at least one of the plurality of antenna elements;

reducing a power level of a wireless signal transmission power amplifier below a threshold level; and performing the change to the at least one of the plurality of antenna elements responsive to the power level being reduced below the threshold level;

wherein determining that a change is to be made comprises determining that a first one of the plurality of antenna elements assigned to a main wireless signal reception path is to be changed to a diversity wireless signal reception path and a second one of the plurality of antenna elements assigned to the diversity wireless signal reception path is to be changed to the main wireless signal reception path.

12. The method of claim 11, wherein the change comprises determining that the at least one of the plurality of antenna elements is to be tuned.

13. The method of claim 11, further comprising:

evaluating a wireless communication performance criterion to obtain a performance evaluation;

wherein determining that the change is to be made to the at least one of the plurality of antenna elements comprises determining the change is to be made to the at least one of the plurality of antenna elements based on the performance evaluation.

14. The method of claim 13, wherein evaluating the wireless communication performance criterion comprises determining transmission power for signals transmitted through each of the plurality of antenna elements and power associated with signals reflected back through each of the plurality of antenna elements.

15. The method of claim 13, wherein evaluating the wireless communication performance criterion comprises determining Received Signal Strength Indication (RSSI) data for each of the plurality of antenna elements.

16. The method of claim 13, wherein evaluating the wireless communication performance criterion comprises processing feedback from a wireless base station, the feedback including signal strength information for signals transmitted from each of the plurality of antenna elements.

17. The method of claim 13, wherein evaluating the wireless communication performance criterion comprises determining proximity information of structure abutting the mobile terminal via at least one sensor.

18. The method of claim 11, further comprising:

increasing the power level of the wireless signal transmission power amplifier above the threshold level responsive to a completion of the change to the at least one of the plurality of antenna element.

19. The method of claim 11, wherein the electronic device is a mobile terminal.

20. A computer program product comprising a non-transitory computer readable program medium, the computer readable program medium comprising computer readable program code configured to carry out the method of claim 11.

21. An electronic device configured to carry out the method of claim 11.

* * * * *